United States Patent
Hsu et al.

(10) Patent No.: US 8,469,579 B2
(45) Date of Patent: Jun. 25, 2013

(54) OPTICAL PLATE WITH MICRO-STRUCTURES AND BACKLIGHT MODULE USING SAME

(75) Inventors: Yu-Ju Hsu, Miao-Li County (TW); Hsien-Wen Chang, Miao-Li County (TW); Ko-Wei Chien, Miao-Li County (TW); Yi-Lin Chang, Miao-Li County (TW)

(73) Assignee: Chimei InnoLux Corporation, Miaoli County (TW)

( * ) Notice: Subject to any disclaimer, the term of this patent is extended or adjusted under 35 U.S.C. 154(b) by 290 days.

(21) Appl. No.: 12/953,232

(22) Filed: Nov. 23, 2010

(65) Prior Publication Data

US 2011/0122653 A1     May 26, 2011

(51) Int. Cl.
     *F21V 7/04*          (2006.01)

(52) U.S. Cl.
     USPC ............................ 362/619; 362/339; 362/620

(58) Field of Classification Search
     USPC ................. 362/617, 619, 330, 339, 620, 623, 362/629
See application file for complete search history.

(56) References Cited

U.S. PATENT DOCUMENTS

| | | | |
|---|---|---|---|
| 6,827,456 B2 | 12/2004 | Parker et al. | |
| 7,004,611 B2 * | 2/2006 | Parker et al. | 362/606 |
| 7,563,013 B2 * | 7/2009 | Lin et al. | 362/620 |
| 7,699,518 B2 * | 4/2010 | Yue | 362/621 |
| 2009/0161386 A1 * | 6/2009 | Chen et al. | 362/620 |
| 2009/0244693 A1 * | 10/2009 | Nishio et al. | 359/321 |
| 2010/0014316 A1 * | 1/2010 | Yue | 362/619 |

* cited by examiner

*Primary Examiner* — John A Ward
(74) *Attorney, Agent, or Firm* — Li & Cai Intellectual Property (USA) Office

(57) ABSTRACT

An exemplary optical plate includes a base and an array of micro-structures. The base includes a first surface and a second surface opposite to the first surface. The micro-structures are provided at the first surface. Each micro-structure includes a base surface substantially coplanar with the first surface of the base and two side surfaces. The base surface has an approximately olive-shaped profile enclosed by two arc-outlines. The two side surfaces extend obliquely from the two arc-outlines and intersect at a ridge of the micro-structure.

17 Claims, 10 Drawing Sheets

OPTICAL PLATE WITH MICRO-STRUCTURES AND BACKLIGHT MODULE USING SAME

BACKGROUND OF THE DISCLOSURE

1. Field of the Disclosure

The present invention relates to optical plates and backlight modules using optical plates.

2. Description of Related Art

A typical liquid crystal display (LCD) device includes an LCD panel, and a backlight module mounted behind the LCD panel for supplying light beams thereto. The backlight module mainly includes a light source and a plurality of optical elements arranged in an order to provide uniform illumination to the LCD panel.

Referring to FIG. 9, a typical backlight module 100 includes a frame 11, a plurality of illuminators 12, a first diffuser plate 13, an optical plate 10 and a second diffuser plate 14, arranged in that order from bottom to top. Referring also to FIG. 10, the optical plate 10 includes a main body 101 and a prism layer 103 formed on the main body 101. A plurality of V-shaped prisms 105 are formed at an outside surface of the prism layer 103. The first and the second diffuser plates 13, 14 are respectively used to scatter light beams transmitting therethrough. The optical plate 10 is used to control light beams transmitting therethrough to emit from the optical plate 10 along predetermined directions generally perpendicular to a liquid crystal panel (not shown) located above the backlight module 100, and used to converge the light beams toward a central region of the backlight module 100 for transmission to the liquid crystal panel.

However, the diffuser plates 13, 14 and the optical plate 10 absorb a portion of the light beams transmitting therethrough. In addition, an air gap typically exists at the interface between each of the diffuser plates 13, 14 and the optical plate 10, and the gapped interface results in some back reflection of light transmitting therethrough. For these reasons, the backlight module 100 typically has reduced light transmission and reduced brightness of light provided to the liquid crystal panel. That is, the utilization of light beams and the efficiency of the backlight module are limited.

What is needed, therefore, is a backlight module which can overcome the described limitations.

SUMMARY

An optical plate includes a base and a plurality of micro-structures. The base includes a first surface and a second surface opposite to the first surface. The micro-structures are provided at the first surface. Each micro-structure includes a base surface substantially coplanar with the first surface of the base and two side surfaces. The base surface has an approximately olive-shaped profile enclosed by two arc-outlines. The two side surfaces extend obliquely from the two arc-outlines and intersect at a ridge of the micro-structure.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DESCRIPTION OF EMBODIMENTS

Reference will now be made to the drawings to describe preferred and exemplary embodiments in detail.

Figure 1:
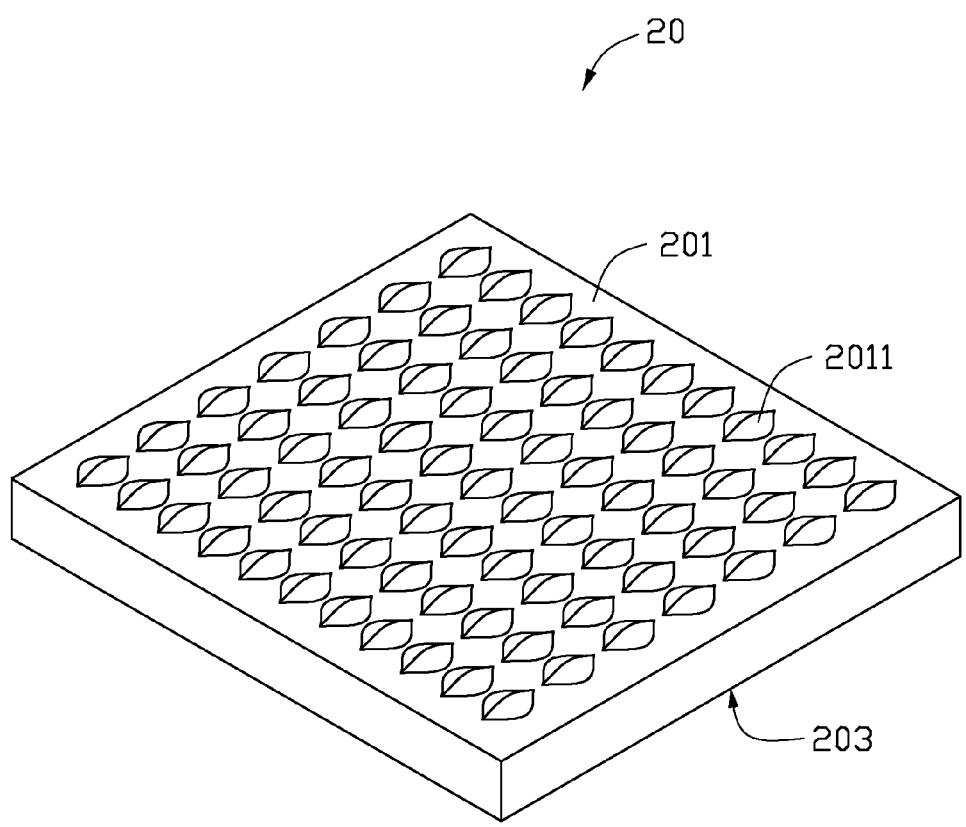
FIG. 1 is a three-dimensional view of an optical plate according to an exemplary embodiment of the present disclosure.

Referring to FIG. 1, a three-dimensional view of an optical plate according to an exemplary embodiment of the present disclosure is shown. The optical plate 20 includes a base (not labeled) and a plurality of micro-structures 2011. The base includes a first surface 201 and a second surface 203 at opposite sides thereof. The first surface 201 has the micro-structures 2011 formed thereat. In the illustrated embodiment, the micro-structures 2011 are arranged in a regular m×n array (matrix).

Figure 2:
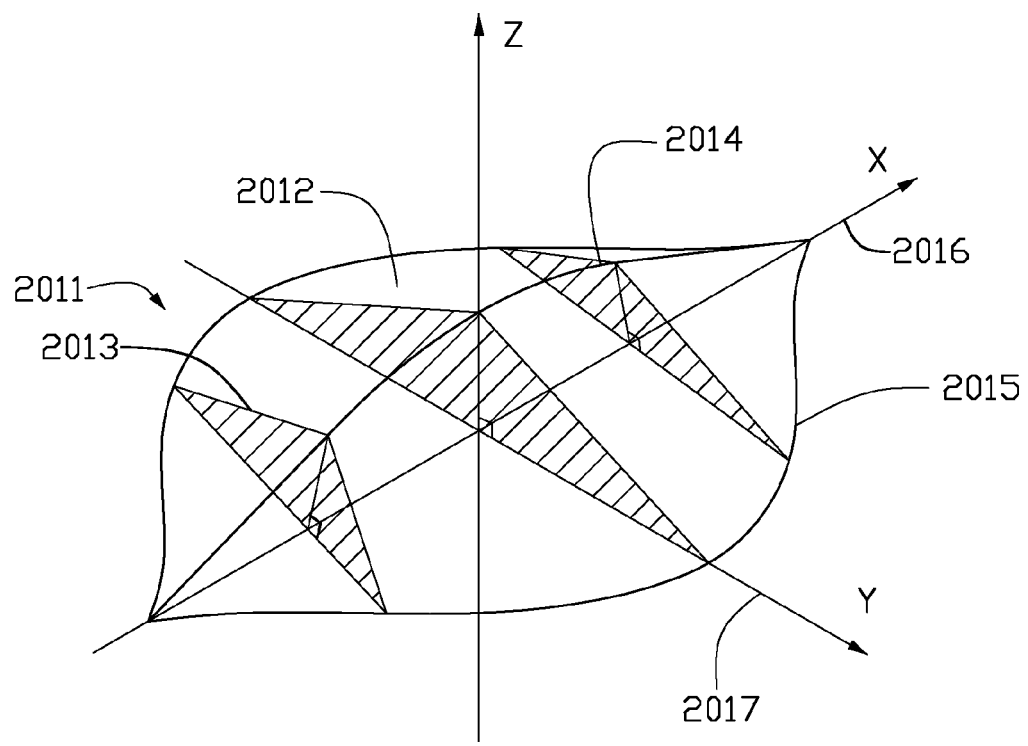
FIG. 2 is essentially an enlarged, three-dimensional view of a micro-structure in the form of a protrusion provided on a first surface of the optical plate of FIG. 1.
Figure 5:
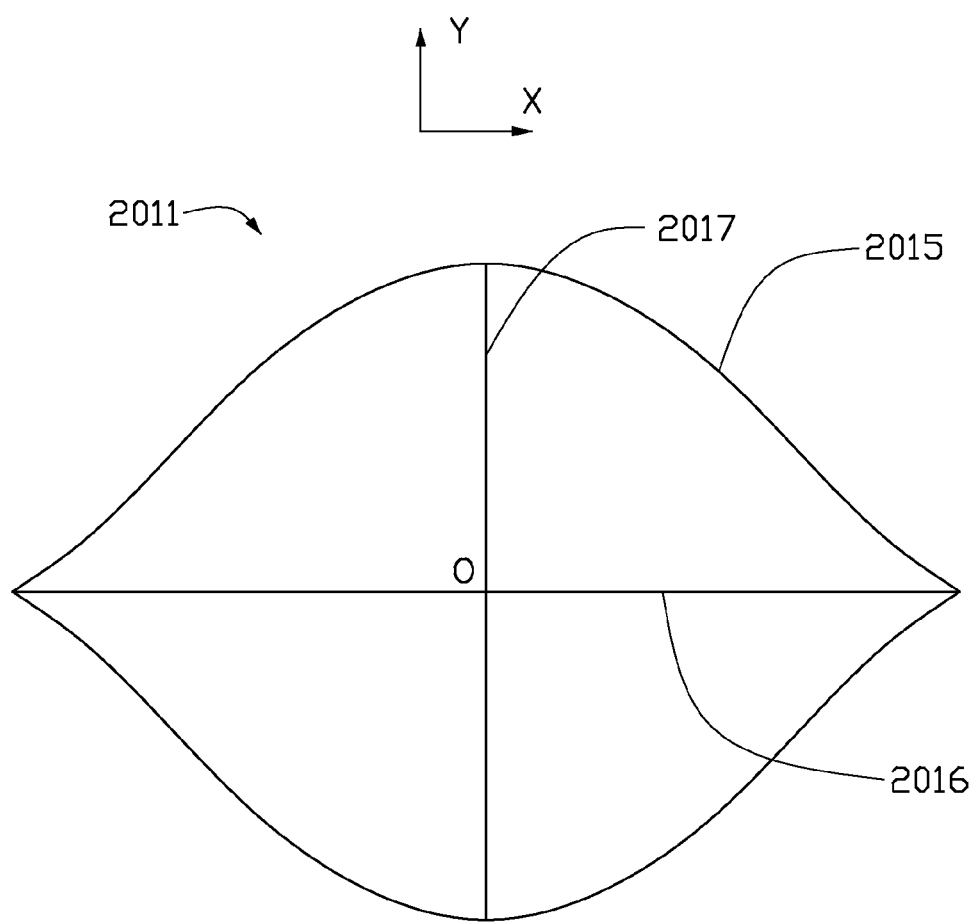
FIG. 5 is a view of a projection on an X-Y plane formed by the protrusion of FIG. 1.

Each of the micro-structures 2011 is in the form of a protrusion. Referring also to FIG. 2, each of the micro-structures 2011 includes a bottom surface 2012 and two side surfaces 2013. The bottom surface 2012 has an approximately olive-shaped profile, and is enclosed by two arc-outlines 2015 on the first surface 201. The two side surfaces 2013 extend upward from the two arc-outlines 2015 and intersect along the top of the micro-structure 2011, thereby forming a ridge 2014. Referring also to FIG. 5, the bottom surface 2012 includes a long axis 2016 and a short axis 2017. A three-dimensional (3-D) Cartesian coordinate system is defined, with the long axis 2016 coinciding with the X axis, the short axis 2017 coinciding with the Y axis, and the intersection of the X axis and the Y axis coinciding with the origin. The direction of the Z axis is the direction of extension of the micro-structure 2011 perpendicularly up from the bottom surface 2012. The micro-structure 2011 is symmetrical about the X-Z plane and symmetrical about the Y-Z plane. A path defining the shape of the bottom surface 2012 of the micro-structure 2011 satisfies the following equation:

$$y = S \times \left\{ y_0 + A \times \frac{1}{1 + \exp\left(\frac{-\left(x - x_c + \frac{w_1}{2}\right)}{w_2}\right)} \times \left(1 - \frac{1}{1 + \exp\left(\frac{-\left(x - x_c + \frac{w_1}{2}\right)}{w_3}\right)}\right) \right\},$$

In the above equation, x and y are Cartesian coordinates of any point along the path, A, $y_0$, $x_c$, $w_1$, $w_2$, $w_3$ and S are constants, and preferably, A, $y_0$, $x_c$, $w_1$, $w_2$, $w_3$ and S satisfy the following ranges: $-13.549<y_0<-9.549$, $-213.5<x<213.5$, $-1.0<x_c<1.0$, $62.754<A<72.754$, $45.72<w_1<280.2$, $8.01<w_2<53.03$, $8.01<w_3<53.03$, and $0.1<S<3$.

Figure 3:
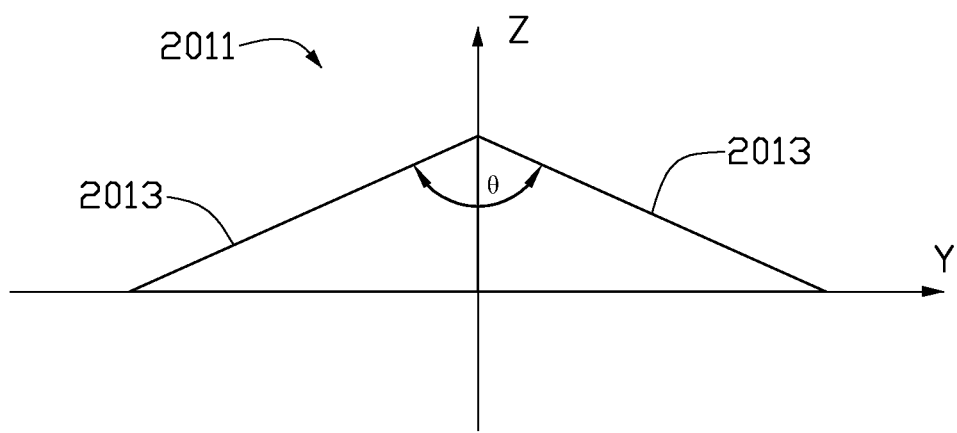
FIG. 3 is a view of a projection on a Y-Z plane formed by the protrusion of FIG. 2.
Figure 4:
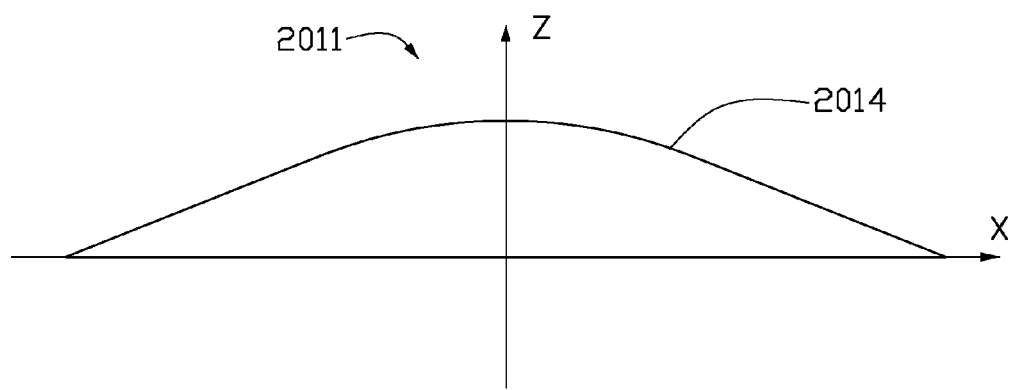
FIG. 4 is a view of a projection on an X-Z plane formed by the protrusion of FIG. 2.

The micro-structure 2011 is axially symmetrical about the X-Z plane, with the ridge 2014 located in the X-Z plane. When the micro-structure 2011 is cut away by any vertical plane, a triangular section is created. Referring also to FIG. 3, when the micro-structure 2011 is cut away by any plane parallel to the Y-Z plane, a triangular section is created, with the triangular section having an apex angle θ and the triangle being an isosceles triangle. Any point along the ridge 2014 is defined by a coordinate z on the Z axis and a coordinate x on the X axis. Referring also to FIG. 4, the series of points follow a mathematical relationship to define a path of the ridge 2014. In particular, the path defining the shape of the ridge 2014 satisfies the following equation:

$$z = y \times \tan\left(90° - \frac{\theta}{2}\right) = S \times \left\{ y_0 + A \times \frac{1}{1+\exp\left(\frac{-\left(x-x_c+\frac{w_1}{2}\right)}{w_2}\right)} \times \left(1 - \frac{1}{1+\exp\left(\frac{-\left(x-x_c+\frac{w_1}{2}\right)}{w_3}\right)}\right)\right\} \times \tan\left(90° - \frac{\theta}{2}\right).$$

In the above equation, x and z are Cartesian coordinates of any point along the path of the ridge, A, $y_0$, $x_c$, $w_1$, $w_2$, $w_3$ and S are constants, and preferably, A, $y_0$, $x_c$, $w_1$, $w_2$, $w_3$ and S, satisfy the following ranges: $-13.549<y_0<-9.549$, $-213.5<x<213.5$, $-1.0<x_c<1.0$, $62.754<A<72.754$, $45.72<w_1<280.2$, $8.01<w_2<53.03$, $8.01<w_3<53.03$, $45°<θ<175°$, and $0.1<S<3$.

With the shape in the X-Y plane of the bottom surface 2012 of each micro-structure 2011 satisfying the first above-mentioned equation and the shape in the X-Z plane of the ridge 2014 of the micro-structure 2011 satisfying the second above-mentioned equation, the micro-structures 2011 at the first surface 201 tend to concentrate the emitting angles of the output light beams. Therefore, the brightness provided by the optical plate 20 can be increased.

The optical plate 20 is typically made of light-transmissible plastic. The plastic is selected from a group consisting of polymethyl methacrylate (PMMA), polycarbonate, polystyrene (PS), polyethylene terephthalate (PET), styrene-methyl methacrylate copolymer, and any combination thereof.

The micro-structures 2011 can be bonded on the first surface 201 of the base after the base is already molded. Alternatively, the micro-structures 2011 can be integrally formed with the base in a same molding step. In the latter case, a mold for forming the base has a plurality of grooves defined in a surface thereof. The grooves of the mold correspond to the micro-structures 2011.

When the optical plate 20 is in use, a light source is provided adjacent the second surface 203. The second surface 203 acts as an incident surface, and the first surface 201 acts as an emitting surface. Light beams emitted by the light source enter the optical plate 20 via the second surface 203, propagate within the optical plate 20, are reflected, refracted and diffracted at the micro-structures 2011, and exit from the first surface 201. The micro-structures 2011 are used to increase the brightness of the output light beams.

Figure 7:
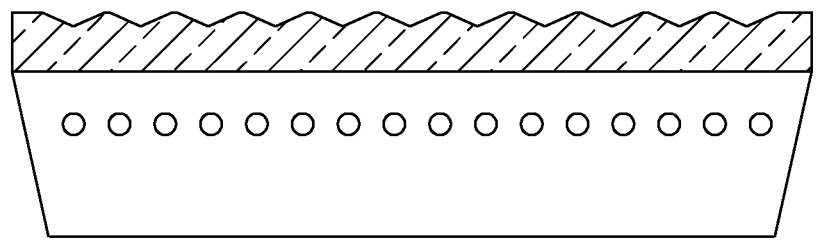
FIG. 7 is similar to FIG. 6, but showing a backlight module using an optical plate according to an alternative embodiment of the present disclosure.

The micro-structures 2011 are not limited to the above-described embodiments. For example, in the above-described embodiments, two sides of the ridge 2014 meeting at an apex of the ridge 2014 are symmetrically opposite each other, and are each inclined relative to the X axis at the same angle. In alternative embodiments, the inclined angles of the two sides of the ridge 2014 can be different from each other. That is, the two sides of the ridge 2014 in the X-Z plane are asymmetric. In addition, the micro-structures 2011 may be arranged in an array of parallel lines of micro-structures 2011, with the micro-structures 2011 in each line being staggered relative to the micro-structures 2011 in each of the two adjacent lines. Furthermore, the micro-structures 2011 are not limited to protrusions. Instead, referring to FIG. 7, the micro-structures 2011 may be a plurality of portions of the optical plate 20 having grooves defined therein. The shape of each groove is the same as the shape of each micro-structure 2011. However, each groove is oriented upside-down compared to the orientation of the micro-structure 2011. The grooves may be arranged in a regular m×n array, or may be arranged in a staggered fashion similar to that described above. Alternatively, the optical plate 20 can have a combination of the micro-structures 2011 and the grooves. In such case, the micro-structures 2011 and the grooves may be arranged alternately with respect to each other.

Figure 6:
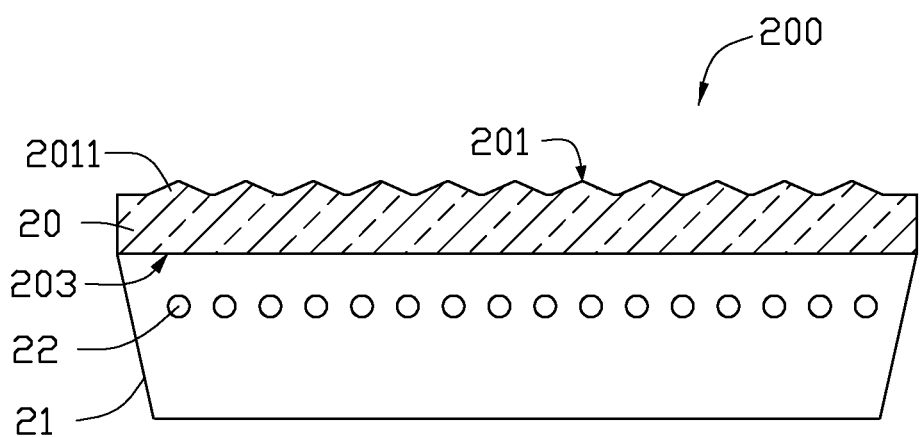
FIG. 6 is a side, cross-sectional view of a backlight module using the optical plate of FIG. 1.

Referring to FIG. 6, a backlight module 200 using the optical plate 20 is shown. The backlight module 200 includes a frame 21, a light source 22, and the optical plate 20 arranged generally in that order from bottom to top.

The frame 21 is made of metallic or plastic material, and may have a high reflection index. Further or alternatively, an inner surface of the frame 21 may be coated with a reflective material.

The light source 22 may be a plurality of cold cathode fluorescent lamps (CCFLs), or may be a plurality of light emitting diodes (LEDs). Light beams emitted by the light source 21 enter the optical plate 20 via the second surface 203, propagate within the optical plate 20, are reflected, refracted and diffracted at the micro-structures 2011, and exit from the first surface 201 of the optical plate 20. Due to the effect of the micro-structures 2011, the light emitted from the first surface 201 is concentrated within a predetermined viewing angle. The convergence function of the optical plate 20 further enhances the brightness of the backlight module 200.

In order to verify the effectiveness of the optical plate 20, nine testing points were designated for the above-described backlight module 100 (i.e., without the micro-structures 2011), and for the backlight 200 (with the micro-structures 2011). Thus a contrast test of the brightness of the backlight module 200 was carried out. The test results are shown in the following table:

| Number of testing point | Brightness of backlight module 100 (cd/m$^2$) | Brightness of backlight module 200 (cd/m$^2$) | Enhancement of brightness |
|---|---|---|---|
| 1 | 1775.00 | 2027.20 | 14.2% |
| 2 | 1652.60 | 1904.20 | 15.2% |
| 3 | 1592.80 | 1926.80 | 20.9% |
| 4 | 1771.20 | 2054.60 | 16.0% |
| 5 | 1623.80 | 1919.00 | 18.2% |
| 6 | 1497.80 | 2082.00 | 39.0% |
| 7 | 1624.20 | 2220.40 | 36.7% |

-continued

| Number of testing point | Brightness of backlight module 100 (cd/m²) | Brightness of backlight module 200 (cd/m²) | Enhancement of brightness |
|---|---|---|---|
| 8 | 1570.00 | 2009.60 | 28.0% |
| 9 | 1566.20 | 2198.20 | 40.3% |

From the table above, it can be concluded that the brightness of the backlight module 200 with the micro-structures 2011 on the emitting surface of the optical plate 20 is higher than that of the backlight module 100. Moreover, the effect of the micro-structures 2011 is significant, with the brightness being increased at least 14 percent.

In other embodiments, a diffuser plate can be positioned between the light source 22 and the optical plate 20, to further increase the brightness of the backlight module 200.

Figure 8:
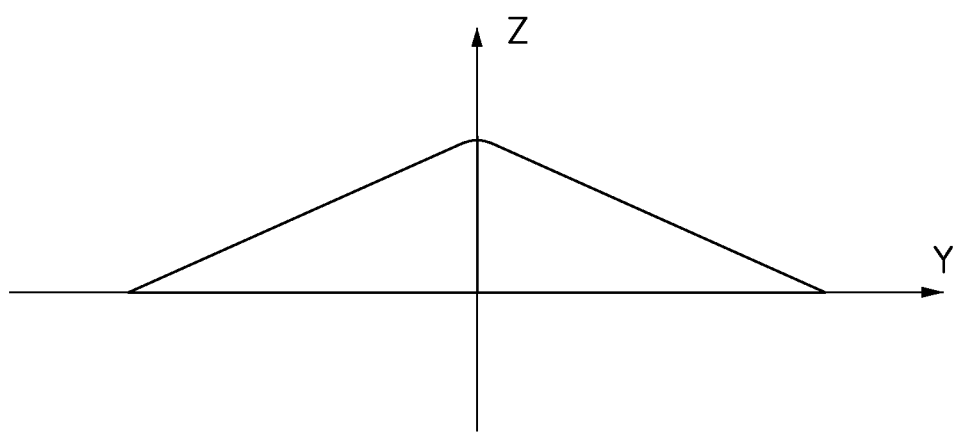
FIG. 8 is similar to FIG. 3, but showing a view in the case of a protrusion according to an alternative embodiment of the optical plate of the present disclosure.
Figure 9:
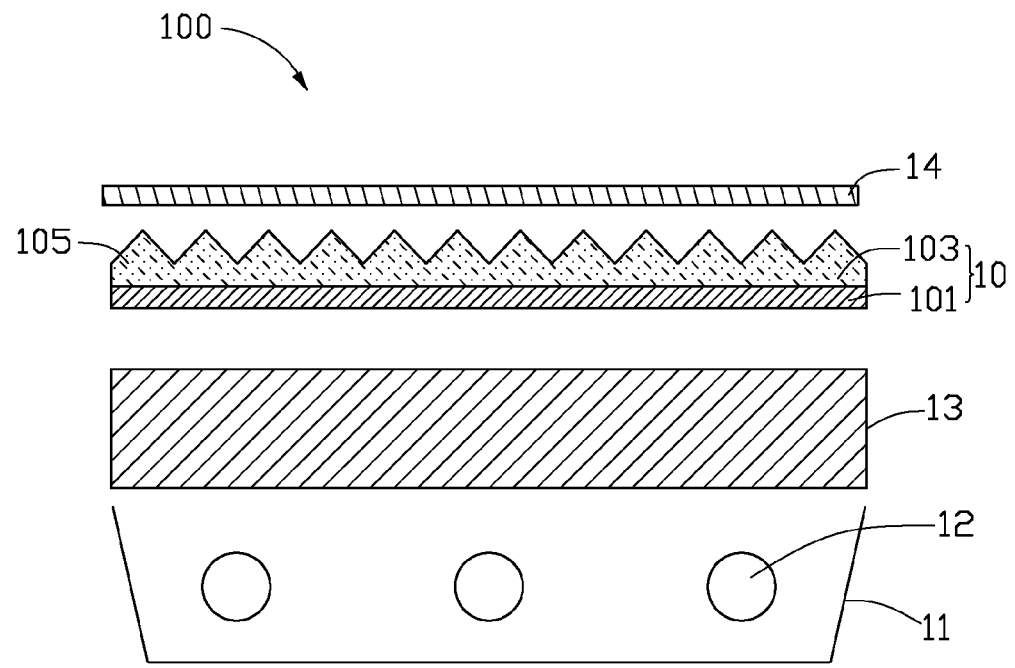
FIG. 9 is a side, cross-sectional view of a conventional backlight module.
Figure 10:
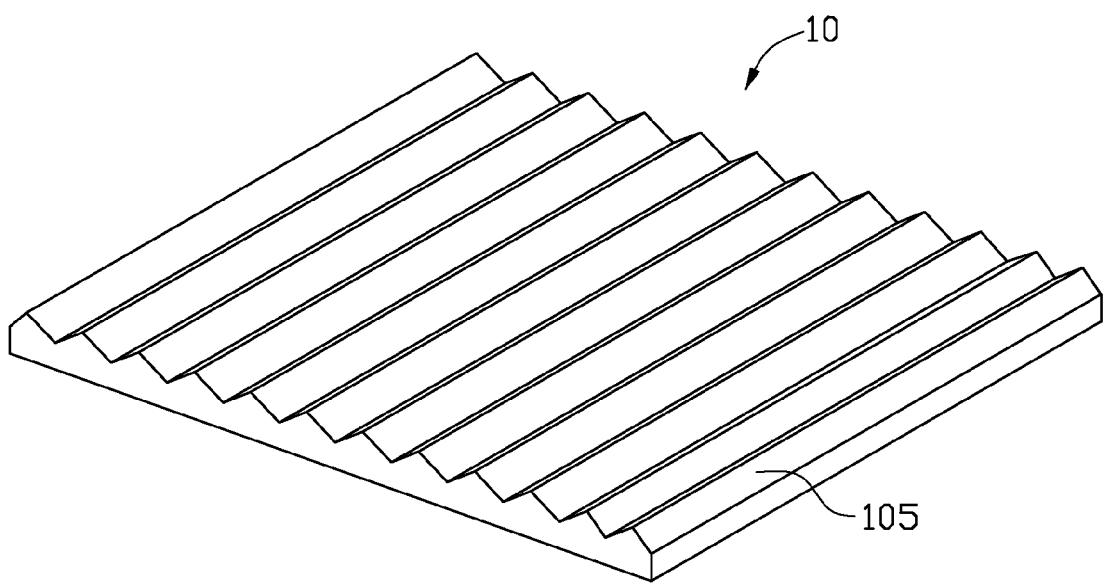
FIG. 10 is an enlarged, three-dimensional view of an optical plate of the backlight module of FIG. 9.

Various modifications and alterations are possible within the ambit of the disclosure herein. For example, referring to FIG. 8, the ridge along the top of the micro-structure 2011 can be milled or otherwise formed such that the ridge has a curved cross-section rather than an angular cross-section. With any of the above-described configurations, the corresponding backlight module may provide substantially uniform intensity of output light beams. That is, an overall intensity distribution of the output light beams is relatively even.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical plate, comprising:
   a base comprising a first surface and a second surface at opposite sides thereof; and
   a plurality of micro-structures provided at the first surface;
   wherein each micro-structure defines a base surface substantially coplanar with the first surface of the base, and two side surfaces, the base surface has an approximately olive-shaped profile enclosed by two arc-outlines, and the two side surfaces extend obliquely from the two arc-outlines and intersect at a ridge of the micro-structure;
   wherein the base surface defines a long axis and a short axis, a three-dimensional (3-D) Cartesian coordinate system is defined with the long axis coinciding with the X axis, the short axis coinciding with the Y axis, the intersection of the X axis and the Y axis coinciding with the origin, and the direction of the Z axis being the direction of the extension of the micro-structure perpendicularly up from the base surface, and a path defining the shape of the base surface satisfies the following equation:

$$y = S \times \left\{ y_0 + A \times \frac{1}{1 + \exp\left(\frac{-\left(x - x_c + \frac{w_1}{2}\right)}{w_2}\right)} \times \left(1 - \frac{1}{1 + \exp\left(\frac{-\left(x - x_c + \frac{w_1}{2}\right)}{w_3}\right)}\right) \right\}$$

wherein, x and y are Cartesian coordinates of any point along the path, A, $y_0$, $x_c$, $w_1$, $w_2$, $w_3$ and S are constants, and A, $y_0$, $x_c$, $w_1$, $w_2$, $w_3$ and S satisfy the following ranges: $-13.549 < y_0 < -9.549$, $-213.5 < x < 213.5$, $-1.0 < x_c < 1.0$, $62.754 < A < 72.754$, $45.72 < w_1 < 280.2$, $8.01 < w_2 < 53.03$, $8.01 < w_3 < 53.03$, and $0.1 < S < 3$.

2. The optical plate of claim 1, wherein the two side surfaces intersect at a top of the micro-structure, forming the ridge.

3. The optical plate of claim 1, wherein a path defining the shape of the ridge satisfies the following equation:

$$z = y \times \tan\left(90° - \frac{\theta}{2}\right), (45° < \theta < 175°).$$

4. The optical plate of claim 3, wherein a triangular section is created when the micro-structure is cut away by any plane parallel to the Y-Z plane, and the triangle is an isosceles triangle.

5. The optical plate of claim 1, wherein the micro-structures comprise protrusions extending upward from the first surface of the base.

6. The optical plate of claim 1, wherein the micro-structures comprise grooves extending inward from the first surface of the base.

7. The optical plate of claim 1, wherein a transverse cross-section of the ridge is angular.

8. The optical plate of claim 1, wherein a transverse cross-section of the ridge is curved.

9. A backlight module, comprising:
   a light source; and
   an optical plate comprising a base and a plurality of micro-structures, the base comprising a first surface and a second surface at opposite sides thereof, the micro-structures provided at the first surface, and the second surface facing toward the light source;
   wherein each micro-structure defines a base surface substantially coplanar with the first surface of the base, and two side surfaces, the base surface has an approximately olive-shaped profile enclosed by two arc-outlines, and the two side surfaces extend obliquely from the two arc-outlines and intersect at a ridge of the micro-structure;
   wherein the base surface defines a long axis and a short axis, a three-dimensional (3-D) Cartesian coordinate system is defined with the long axis coinciding with the X axis, the short axis coinciding with the Y axis, the intersection of the X axis and the Y axis coinciding with the origin, and the direction of the Z axis being the direction of the extension of the micro-structure perpendicularly up from the base surface, and a path defining the shape of the base surface satisfies the following equation:

$$y = S \times \left\{ y_0 + A \times \frac{1}{1 + \exp\left(\frac{-\left(x - x_c + \frac{w_1}{2}\right)}{w_2}\right)} \times \left(1 - \frac{1}{1 + \exp\left(\frac{-\left(x - x_c + \frac{w_1}{2}\right)}{w_3}\right)}\right) \right\}$$

wherein, x and y are Cartesian coordinates of any point along the path, A, $y_0$, $x_c$, $w_1$, $w_2$, $w_3$ and S are constants, and A, $y_0$, $x_c$, $w_1$, $w_2$, $w_3$ and S satisfy the following ranges: $-13.549 < y_0 < -9.549$, $-213.5 < x < 213.5$, $-1.0 < x_c < 1.0$, $62.754 < A < 72.754$, $45.72 < w_1 < 280.2$, $8.01 < w_2 < 53.03$, $8.01 < w_3 < 53.03$, and $0.1 < S < 3$.

10. The backlight module of claim 9, wherein the two side surfaces intersect at a top of the micro-structure, forming the ridge.

11. The backlight module of claim 9, wherein a path defining the shape of the ridge satisfies the following equation:

$$z = y \times \tan\left(90° - \frac{\theta}{2}\right), (45° < \theta < 175°).$$

12. The backlight module of claim 11, wherein a triangular section is created when the micro-structure is cut away by any plane parallel to the Y-Z plane, and the triangle is an isosceles triangle.

13. The backlight module of claim 9, wherein the micro-structures comprise protrusions extending upward from the first surface of the base.

14. The backlight module of claim 9, wherein the micro-structures comprise grooves extending inward from the first surface of the base.

15. The backlight module of claim 9, wherein a transverse cross-section of the ridge is angular.

16. The backlight module of claim 9, wherein a transverse cross-section of the ridge is curved.

17. An optical plate, comprising:
a base comprising a first surface and a second surface at opposite sides thereof; and
a plurality of micro-structures provided at the first surface;
wherein in a three-dimensional (3-D) Cartesian coordinate system, each micro-structure is defined by a series of parallel isosceles triangles each defined in a plane parallel to a Y-Z plane and symmetrical about an X-Z plane with the series of triangles aligned along an X axis, two vertexes of each triangle located in the X-Y plane, another vertex of each triangle located in the X-Z plane, the vertexes of the series of triangles in the X-Y plane forming an approximately olive-shaped profile, and the vertexes of the series of triangles in the X-Z plane forming a ridge profile,
wherein a path defining the shape of the vertexes of the series of triangles in the X-Y plane satisfies the following equation:

$$y = S \times \left\{ y_0 + A \times \frac{1}{1 + \exp\left(\frac{-\left(x - x_c + \frac{w_1}{2}\right)}{w_2}\right)} \times \left(1 - \frac{1}{1 + \exp\left(\frac{-\left(x - x_c + \frac{w_1}{2}\right)}{w_3}\right)}\right) \right\}$$

wherein, x and y are Cartesian coordinates of any point along the path, A, $y_0$, $x_c$, $w_1$, $w_2$, $w_3$ and S are constant, and A, $y_0$, $x_c$, $w_1$, $w_2$, $w_3$ and S, satisfy the following ranges: $-13.549 < y_0 < -9.549$, $-213.5 < x < 213.5$, $-1.0 < x_c < 1.0$, $62.754 < A < 72.754$, $45.72 < w_1 < 280.2$, $8.01 < w_2 < 53.03$, $8.01 < w_3 < 53.03$, and $0.1 < S < 3$.

* * * * *